United States Patent Office 2,801,488
Patented Aug. 6, 1957

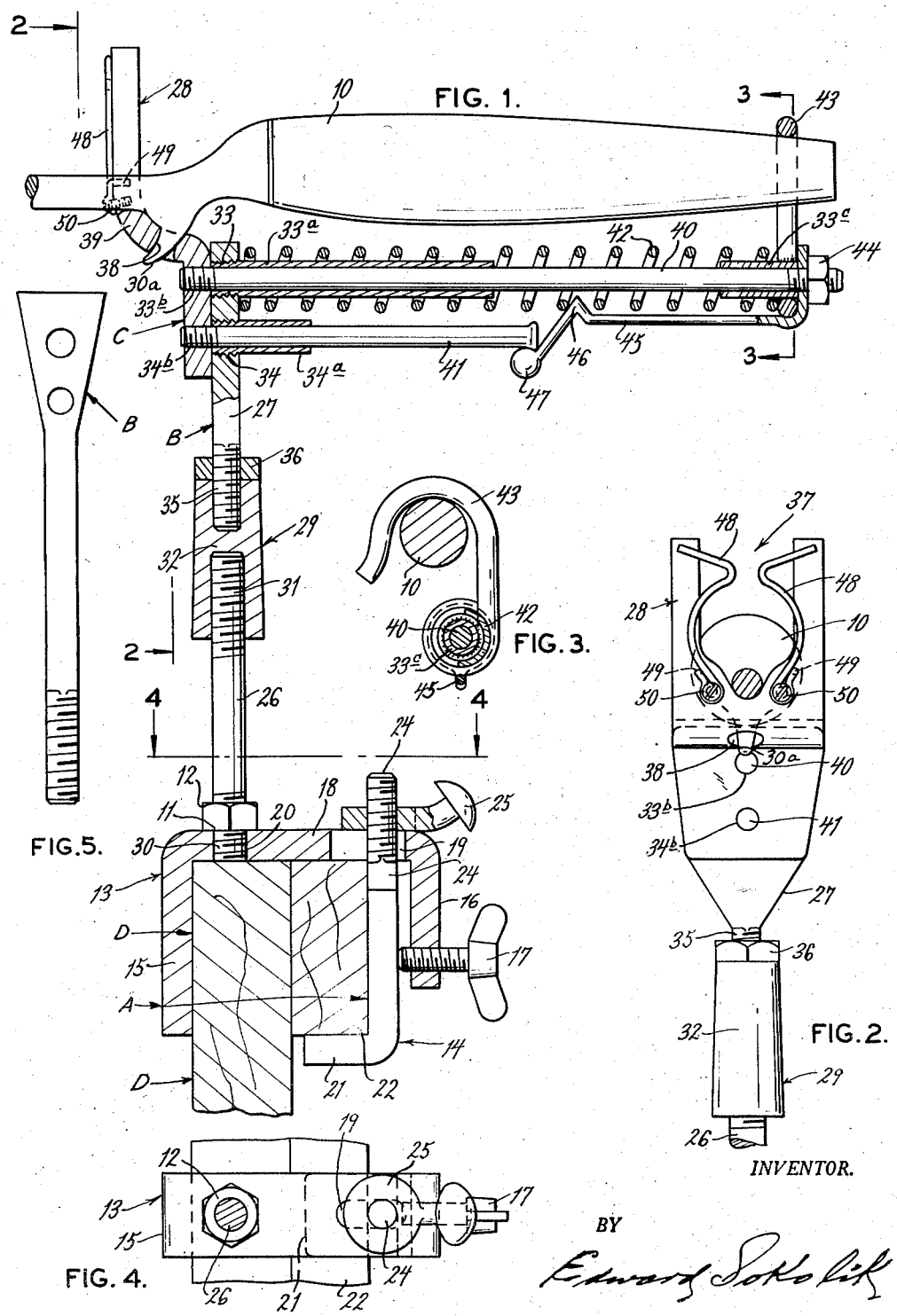

2,801,488

DEVICE FOR HOLDING CASTING RODS

Edward Sokolik, New Brighton, Minn.

Application November 7, 1955, Serial No. 545,309

4 Claims. (Cl. 43—17)

This application is a continuation in part of my application Serial No. 295,085, filed June 23, 1952, and abandoned, and application Serial No. 303,563, filed August 9, 1952, and abandoned in favor of this application which relates to a device for holding fishing casting rods, said device being adapted to be clamped to the gunwale of a boat, and the principal object thereof being to securely hold the casting rod;

Another object of this invention is to provide a holder permitting the rod, when a fish is caught on the line thereof, to move to and fro against the resistance of a spring thereby tiring out the fish and preventing snapping of the fish line;

A further object of this invention is to provide a holder that permits the casting rod to oscillate to relieve the rod of bending stress when a fish caught on the line swims sideways;

A still further object of this invention is to provide a holding device adapted to indicate acoustically and visibly when a fish is caught on the line;

A still further object of this invention is to provide a rod holding device with a two-way adjustable clamp adapted for clamping to gunwales of various sizes and also to provide a device that is comparatively simple, inexpensive, practicable and readily understood as to its principles of operation.

These and other objects will be apparent as the description progresses.

Invention resides in the structure, arrangement, combination, shape and principles of operation.

In the accompanying drawings, which are a part of the disclosure:

Fig. 1 is an elevational view chiefly in section of the casting rod holding device clamped to the gunwale of a boat and holding the casting rod.

Fig. 2 is an elevational view on line 2—2 of Fig. 1.

Fig. 3 is an elevational view on line 3—3 Fig. 1.

Fig. 4 is a plan view on line 4—4 Fig. 1.

Fig. 5 illustrates a form of an integral standard.

In the embodiment of the invention as shown in Figure 1, there is shown a clamp A, a standard B affixed to said clamp A, preferably screw-threadably as shown at 11 and locked by the lock-nut 12, and a reciprocating saddle assembly C.

The clamp A includes two clamping members 13 and 14. The top member 13 is preferably a bar having one jaw 15 thereof extending down the outer side of the gunwale D of the boat preferably 2 to 3 inches. The other jaw 16 is extended down the inner side of the gunwale D preferably less than the jaw 15. The jaw 16 is provided with a hand screw 17, and the tire portion 18 of the member 13 has an elongated slot 19 formed therein near the jaw 16, and a screw-threaded bore 20 formed therein near the jaw 15.

The other clamping member 14 is preferably a bar having one end-portion 21 thereof horizontally extended to bear against the underside of the batten 22 of the gunwale D and the other end-portion 24 formed into a screw-threaded shank projected into and through the slot 19 as shown in Fig. 1 and Fig. 4, and provided with a hand screw 25. The hand screw 17 bears against the clamping member 14 which in turn bears against the side of the batten 22.

The standard B is about 8 inches high to allow the fish line to clear the gunwale D of the stern of the boat and is comprised preferably of two sections 26 and 27, and a swivel means 29, which is illustrated, as a turnbuckle connecting the sections 26 and 27 the section 26 and 27 may be formed in one unit if no swivel means is employed (see Fig. 5).

The element 26 is preferably a stud having both end-portions 30 and 31 thereof screw-threaded. The end-portion 30 is preferably screw-threadably secured in the bore 20, Fig. 1, of the tie-portion 18 of the member 13 and locked thereto by the lock-nut 12. This stud is required to be of a diameter sufficient to withstand the stresses of a large fish. If it be of hardened iron it may be of lesser diameter than if not hardened or tempered.

The turn-buckle or swivel 29 has one end thereof screw threadably connected to the shank 31, as illustrated. The swiveling is to be accomplished in this joint as the other joints in the standard B are locked, but that is a matter of choice. However, this arrangement, wherein the swivel means is in the form of a turn-buckle, is preferred. It will be noted that this turn-buckle, as illustarted, has a diaphragm 32.

The shank 31 of the stud 26 is spaced at least a quarter turn from said diaphragm 32 to provide for ample turning of the turnbuckle 29 thereon. This shank 31, it will be observed, is also of considerable length and in a precise fit with the socket of the turnbuckle 29 to afford a durable and smoothly turning joint.

The element 27 is preferably a bar having at the upper end thereof a pair of slideways 33 and 34 preferably one above the other and in the form of bores. Bore 34 preferably is of lesser diameter than bore 33 and subjacent thereto as shown. This section 27 has at the other end thereof a screw-threaded shank 35 preferably of lesser diameter than the shank 31, screwed into the upper socket of the turnbuckle 29 generally clear down to the diaphragm 32 and preferably locked therein by the lock-nut 36.

These bores 33 and 34 afford bore-slideways for cylindrical members having a piston-like fit therein and reciprocating therein, but are preferably provided with tubing 33a and 34a which should be of rust resistant material. These tubings 33a and 34a may be extended out from the bores 33 and 34. The tubing 33a is, as illustrated, longer than the tubing 34a for reasons hereinafter disclosed.

The upright member 28 of the saddle assembly C, Fig. 2, is also preferably a bar member which is widened at its upper end-portion in the form of an inverted yoke, and provided at its lower end-portion preferably with a pair of bores 33b and 34b spaced apart in a manner so that their central axes are in alignment with the axes of the bore-slideways 33 and 34. These bores 33b and 34b have a diameter corresponding to the diameters of the bore-slideways 33 and 34, provided said bores 33 and 34 are not provided with tubings 33a and 34a, but if provided with tubings 33a and 34a, then the diameters of the bores 33b and 34b correspond to the diameters of said tubings.

The widened upper end-portion has an opening 37 extending down from the end thereof, said opening being narrow at the bottom. The wider upper portion of the opening being adapted to receive the handle of a casting rod 10 not having a shank but provided with a finger-piece 30a connecting the handle and the rod, and the narrow lower portion of said opening being adapted to receive the connecting shank of a casting rod having such a shank.

Subjacent to the narrow portion of the opening 37, is a small slot 38, and a narrow top member 39 between the opening 37 and said slot 38. This slot 38 is adapted to receive the finger-piece 30a of the connecting shank of a casting rod that has such a shank and the stop 39 affords a substitute for a finger and is accordingly adapted to engage that portion of the connecting shank that is above the finger-piece 30a.

Elongated and generally cylindrical slides 40 and 41 are affixed to the bores 33b and 34b, preferably screw-threadably. The handle of the casting rod 10 and these slides 40 and 41, which reciprocate in the bore-slideways 33 and 34 or in the tubings 33a and 34a in the bore-slideways, should be as close together as possible to allow said slides 40 and 41 to reciprocate without being bindingly stalled in the slideways 33 and 34 when a fish is caught and pulls upon the casting rod 10.

The slides 40 and 41 should be of rust resistant material to facilitate reciprocation in the rust resistant tubings 33a and 34a, respectively. The slide 40 may be of a length corresponding to the length of the handle of the casting rod 10 and preferably of a diameter exceeding that of the slide 41, and the slide 41 may be substantially one half the length of the slide 40. This slide 40, if reciprocating directly in the slideway 33, may be tubular.

A compression coil spring 42 encircles the slide 40 or the tubing 33a thereon. This spring 42 should have an inner diameter corresponding to the diameter of the slide 40 or the tubing 33a thereon, if used and should have a compression resistance that corresponds to that of a large fish, thus tiring out the fish and preventing breaking of the fish line on the casting rod 10. The coils of this spring 42 should be amply spaced to provide a large range of compression; they afford visual indicators by the compressioning thereof when a fish is caught.

The free end portion of slide 40 may be formed with a screw threaded portion to receive a hook-member 43 mounted on a tube 33c in an upright position in such a manner that it is adapted to receive and hold the handle of the casting rod 10 and also afford a base of resistance for the other end of the coil spring 42. The hook 43 and tube 33 may be locked in place by the nut 44.

The slide 41 is preferably of lesser diameter than the slide 40 and of a length exceeding the length of the coil spring 42 when said spring is completely compressed so as to prevent said slide 41 from being pulled out of the slideway 34, or tubing 34a in which it reciprocates. It is sufficiently subjacent to the slide 40 to afford therewith means for reciprocation of the saddle assembly C and means for maintaining upright stability of said assembly C.

The slide 41 is illustrated as cylindrically formed and screw-threadably secured to the member 28 and provided with an enlarged free end, which is not necessary if said slide 41 is sufficiently long enough to resist being pulled out of the slideway 34, or the tubing 34a therein. This slide 41 may also serve as signal means, that is, as an audible indicator of when a fish is caught. In that instance, it is preferable that it be of resonant as well as rust resistant material.

An elongated spring 45 is provided to knock at the end of the slide 41. This spring has one end affixed to the free end of the slide 40, preferably by an eyelet slipped onto the free end of said slide 40 and locked thereon by the nut 44. This spring has a kink 46 formed in it, said kink being adapted to be interposed between adjacent coils of the compression spring 42 preferably adjacent to the free end of the slide 41. The free end of the spring 45 is extended to the end of the announcer 41 and is illustrated as provided with a head 47. When the coil spring 42 is compressed by a fish biting or being caught, the kink 46 is forced from between the coils of the coil spring 42 correspondingly forcing the head 47 from the slide 41, said head 47 knocking at the end of the announcing slide 41, when the kink 46 slips between the next two or more adjacent coils of the coil spring 42.

A holding spring 48, or two such springs, opposed, may be used in the opening 37 of the member 28 to prevent inadvertent displacement of the casting rod 10 from said opening 37. Each spring has one end bent in the form of a U, U-shaped springs each having a stub 49 which extends into an aperture in the member 28. A separate screw 50 secures each spring 48 to the member 28 through the U shaped loop. This manner of securing each spring 48 is preferable but may be variously modified. The free or yielding end of this spring 48, is preferably bent, said bend being in the form of a V and disposed across the opening 37, so that it is readily displaced by inserting or removing the casting rod 10 from said opening 37.

It is to be understood that only a few preferable embodiments and arrangements of the invention are disclosed and that other embodiments and arrangements in detail may be resorted to within the merits and concept of the invention without departing from the scope of the appended claims.

What I claim is:

1. The combination with the gunwale of a boat of a device adapted to have a casting rod saddled therein in troll fishing, said device comprising: a clamp adapted to be secured to the gunwale; a standard provided with a pair of slideaways and secured to the clamp; and a saddle assembly adapted to carry the casting rod and to reciprocate horizontally under the pulling strain of a fish caught, mounted in the slideways of the stand and comprising an upright member provided at its upper end with a saddle adapted for carrying one end of the casting rod, and at its lower end with an upper slide and a lower slide arranged at right angles to the lower portion of said upright member and affording means for reciprocating and maintaining upright stability of the saddle assembly, said slides being projected through the slideways of the standard in such a manner that the lower end of the upright member bears against one side of the upper end of said standard; a stress absorbing compression coil spring encircling the upper slide, one end of said compression coil spring bearing against the other side, a base of resistance, of said standard; and means cooperating with the free end of the upper slide and adapted to afford a base of resistance at the other end of the compression coil spring when the slides reciprocate under a pulling stress exerted on the reciprocatory saddle assembly so as to move the same.

2. The structure defined in claim 1, in which the standard may be formed in two sections connected by a swivel means.

3. The structure defined in claim 1, in which at least one of the slides is received in a length of tubing rigidly associated with the slideway of the standard, said tubing being sufficiently extended to prevent stalling therein of the slide when pulling stress is exerted upon the saddle assembly.

4. The structure defined in claim 1, and an elongated spring having one end thereof adapted to be rigidly secured to the free end of the upper slide and having the other end thereof extended beyond and disposed under the free end of the lower slide, said spring having a kink formed therein adapted to be interposed between adjacent coils of the compression coil spring, and to be actuated by the coils of said compression coil spring when compressed, causing the free end of said elongated spring to knock at the free end of the lower slide, thereby serving as an audible signal means to indicate that a fish is caught; and lock-means cooperating with the free end of the upper slide to lock said elongated spring thereon.

No references cited.